US012759640B2

(12) United States Patent
Testa

(10) Patent No.: US 12,759,640 B2
(45) Date of Patent: Oct. 13, 2026

(54) REINFORCED CHASSIS CELL FOR A MOTOR VEHICLE AND RELATED MANUFACTURING PROCEDURE

(71) Applicant: FERRARI S.P.A., Modena (IT)

(72) Inventor: Daniele Testa, Modena (IT)

(73) Assignee: FERRARI S.P.A., Modena (IT)

( * ) Notice: Subject to any disclaimer, the term of this patent is extended or adjusted under 35 U.S.C. 154(b) by 482 days.

(21) Appl. No.: 18/330,085

(22) Filed: Jun. 6, 2023

(65) Prior Publication Data

US 2023/0399055 A1 Dec. 14, 2023

(30) Foreign Application Priority Data

Jun. 8, 2022 (IT) ........................ 102022000012167

(51) Int. Cl.

| | |
|---|---|
| ***B62D 29/00*** | (2006.01) |
| ***B62D 21/15*** | (2006.01) |
| ***B62D 25/02*** | (2006.01) |
| ***B62D 25/04*** | (2006.01) |

(52) U.S. Cl.

CPC ......... *B62D 25/025* (2013.01); *B62D 21/157* (2013.01); *B62D 25/04* (2013.01); *B62D 29/001* (2013.01)

(58) Field of Classification Search

CPC ...... B62D 25/025; B62D 25/04; B62D 25/02; B62D 21/152; B62D 21/157; B62D 29/04

USPC ........ 296/29, 23.01, 3, 193.06, 187.12, 9, 1, 296/901.01

See application file for complete search history.

(56) References Cited

U.S. PATENT DOCUMENTS

| | | | | |
|---|---|---|---|---|
| 2004/0108705 A1* | 6/2004 | Witucki | B62D 21/00 | 280/781 |
| 2011/0025100 A1* | 2/2011 | Cimatti | B62D 25/025 | 296/204 |
| 2015/0137558 A1* | 5/2015 | Ayuzawa et al. | B62D 25/025 | 296/193.07 |
| 2016/0229456 A1 | 8/2016 | Boettcher et al. | | |
| 2017/0361875 A1* | 12/2017 | Ayuzawa | B62D 27/02 | |
| 2021/0206432 A1* | 7/2021 | Willison | B62D 23/00 | |
| 2024/0067359 A1* | 2/2024 | Corvaglia | B29D 24/004 | |

FOREIGN PATENT DOCUMENTS

| | | | |
|---|---|---|---|
| CN | 103180155 A * | 6/2013 | B60J 1/18 |
| CN | 106608286 A * | 5/2017 | B62D 25/04 |
| DE | 10314080 A1 * | 10/2004 | B62D 25/04 |

(Continued)

OTHER PUBLICATIONS

CN106608286 Text (Year: 2017).*

(Continued)

*Primary Examiner* — Jacob S. Scott

(74) *Attorney, Agent, or Firm* — CANTOR COLBURN LLP

(57) ABSTRACT

A chassis cell for a motor vehicle defines a passenger compartment for the motor vehicle and comprises at least one shell comprising carbon fibre and at least two first walls facing one another so as to define a cavity between the first walls, characterized in that it further comprises one or more partitions comprising carbon fibre, arranged inside the cavity according to an arrangement, and each extending transversally to the first walls between two first ends respectively connected to the first walls seamlessly.

11 Claims, 6 Drawing Sheets

(56) References Cited

FOREIGN PATENT DOCUMENTS

| | | | | | |
|---|---|---|---|---|---|
| DE | 102014102372 | B4 | * | 8/2022 | ........... B62D 29/008 |
| EP | 2860087 | A1 | | 4/2015 | |
| WO | WO-2013183360 | A1 | * | 12/2013 | ........... B62D 29/048 |
| WO | 2020247903 | A1 | | 12/2020 | |

OTHER PUBLICATIONS

Translation—CN 103180155 A (Year: 2013).*
Translation—DE 102014102372 B4 (Year: 2022).*
Translation—DE 10314080 A1 (Year: 2004).*
Translation—WO 2013183360 A1 (Year: 2013).*
Italian Search Report for Application No. 102022000012167; Filing Date: Jun. 8, 2022; Date of Mailing - Jan. 12, 2023, 8 pages.

* cited by examiner

REINFORCED CHASSIS CELL FOR A MOTOR VEHICLE AND RELATED MANUFACTURING PROCEDURE

CROSS-REFERENCE TO RELATED APPLICATIONS

This patent application claims priority from Italian patent application no. 102022000012167 filed on Jun. 8, 2022, the entire disclosure of which is incorporated herein by reference.

TECHNICAL FIELD

The invention relates to a chassis cell or body cell for a motor vehicle, in particular of sports type.

The invention further relates to a process for manufacturing the chassis cell or body cell.

PRIOR ART

As is known, a motor vehicle comprises a body which includes a bearing structure or chassis, which defines a skeleton of the motor vehicle with the function of supporting the various components of the motor vehicle.

Furthermore, the body also includes a bodywork, i.e. an assembly of bodies or panels, such as for example the hoods, the doors, the roof, the fenders, the bumpers, etcetera, which are carried by the chassis and define the surfaces and the outer contours of the motor vehicle.

The chassis comprises a chassis cell or body cell which defines the passenger compartment of the motor vehicle, in which the passengers and the driver of the motor vehicle are accommodated.

The chassis cell has the function of delimiting the passenger compartment but especially of guaranteeing a suitable protection to the people accommodated, hence the chassis cell has to be particularly sturdy and rigid, so that the people inside the passenger compartment are relatively safe in case of crashes.

In general, the producers of motor vehicles consider desirable for the chassis cell to also be as light as possible, such that the overall weight of the motor vehicle remains contained.

Therefore, the chassis cell is usually composed of one or more internally hollow shells interconnected to one another.

A particularly suitable material for manufacturing the shells is carbon fibre for its properties of lightness and sturdiness.

Therefore, in some sports motor vehicles, the shells contain carbon fibre.

Normally, the shells containing carbon fibre are further reinforced or strengthened therein by means of structural foams and/or honeycomb structures with the function of stiffening the hollow sections of the shells.

In order to be able to introduce in each one of the shells the structural foams or the honeycomb structures, which contain materials which are different from that of the shells, a typical process is that of gluing two half-shells baked or polymerized separately, so that the foams or the honeycomb structures can be interposed between the half-shells before gluing the latter definitively, thus forming the complete closed shell with the structural foams and/or the honeycomb structures therein.

In general, the need is felt to improve the known chassis cells, in particular limiting the weight thereof, though maintaining or actually increasing the sturdiness thereof, or also only increasing the sturdiness thereof.

Furthermore, the need is also felt to provide processes for manufacturing the chassis cell, in which the processes are alternative to the known or improved ones, for example simpler, more cost-effective, and/or more reliable.

In particular, the need is also felt for the processes to be monitorable and/or manageable; in other words, the need is felt for the processes to enable determining or providing the final quality of the chassis cell or for the processes to allow an intervention of an operator also during their carrying out, for example for evaluating a state of the processes or of the intermediate products, or for performing adjustments useful for improving the final quality of the chassis cell.

An object of the invention is to satisfy at least one of the above-mentioned needs.

DESCRIPTION OF THE INVENTION

The object is achieved by a chassis cell for a motor vehicle and by a relative manufacturing process as defined in the independent claims.

The dependent claims define particular embodiments of the invention.

BRIEF DESCRIPTION OF THE DRAWINGS

In the following, embodiments of the invention will be described for a better understanding thereof by way of non-limiting examples and with reference to the accompanying drawings wherein.

EMBODIMENTS OF THE INVENTION

Figure 1:
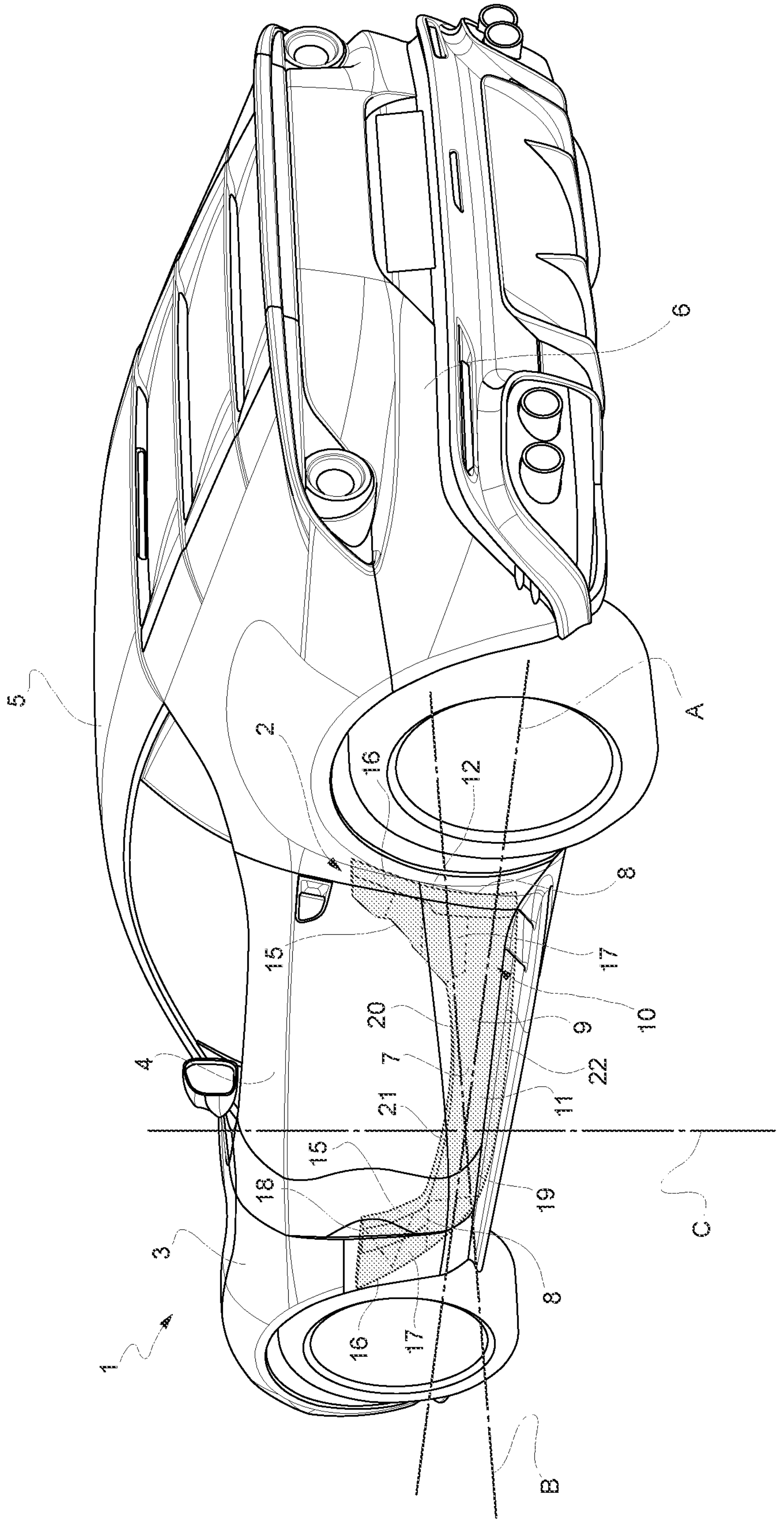
FIG. 1 is a perspective view of a motor vehicle comprising a chassis cell according to an embodiment of the invention.

In FIG. 1, reference numeral 1 is used for indicating, as a whole, a motor vehicle.

As all motor vehicles, the motor vehicle 1 has a normal forward direction and comprises a passenger compartment for accommodating a driver and possibly one or more passengers.

The motor vehicle 1 comprises a chassis cell or body cell 2 which defines or contours the passenger compartment. For example, the chassis cell 2 can be monolithic.

The chassis cell 2 is more in general part of a chassis of the motor vehicle 1, where the chassis supports a plurality of components, of which some define for example outer surfaces of the motor vehicle 1, i.e. surfaces visible by people on the outside of the passenger compartment.

The components supported by the chassis include in particular at least one between a fender 3, a side door 4, a roof 5, and a rear bumper 6 with reference to the forward direction of the motor vehicle 1.

FIG. 1 in particular schematically illustrates a side end 7 of the chassis cell 2. The term side is to be understood with reference to the orientation according to which the chassis cell 2 will be arranged in the context of the motor vehicle 1 and with reference to the forward direction of the latter. Alternatively, the term side could also be understood with reference to the orientation of the passenger compartment.

The side end 7 is open towards the passenger compartment, i.e. has an opening which allows a person to get into the passenger compartment.

In particular, the opening of the side end 7 can be occupied by the side door 4, as in FIG. 1, where the side door 4 is illustrated in a closing position, i.e. a position in which the side door 4 prevents the person from getting into the passenger compartment through the opening.

In other words, the side door 4 in the closed position covers or hides the opening and also the side end 7 according to a point of view on the outside of the motor vehicle 1.

The side end 7 comprises a beam, in particular of box type. The beam extends along a straight direction or axis A, in particular parallel to the forward direction or anyway directed longitudinally, i.e. directed so as to flank the side door 4 in the closing position.

The beam has a concave profile according to the axis A; in the context of the motor vehicle 1, the profile of the beam is concave upwards. In other words, the profile of the beam is concave towards the opening of the side end 7.

The beam is specifically one single piece and comprises two pillars 8 defining the respective ends of the beam according to the axis A. Furthermore, the beam comprises a longitudinal strut or door sill 9 extending along the axis A between the pillars 8.

The door sill 9 is connected to the pillars 8 seamlessly, i.e. forms one single body with the pillars 8.

In the following, the expression "seamlessly" may be understood with the meaning of one among the expressions integral, coherent, in an indistinguishable manner, i.e. with the meaning of any combination of said expression, for example with the meaning of integral, coherent, and in an indistinguishable manner.

The pillars 8 extend transversally with respect to the axis A.

Therefore, the pillars 8 form the concavity of the profile of the beam.

Besides the side end 7, the chassis cell 2 also comprises a bottom not illustrated defining a platform or a floor of the passenger compartment.

More specifically, the chassis cell 2 comprises another side end opposite and identical to the side end 7, in particular according to a direction horizontal and orthogonal to the forward direction.

The floor extends between the side end 7 and the other side end.

The floor is preferably connected to the side end 7 seamlessly, i.e. the floor forms one single body with the side end 7 and possibly also with the other side end.

In general, the chassis cell 2 comprises at least one shell 10, which comprises carbon fibre.

The chassis cell 2 can be understood as one single shell or as a plurality of shells 10 interconnected to one another, regardless of the type of connection between the shells 10. For example, the shells 10 can be connected to one another seamlessly, i.e. so as to form one single body, i.e. monolithic, comprising carbon fibre.

In this case, the beam of the side end 7 constitutes a shell 10, as well as also the floor preferably constitutes a shell 10.

The following description will briefly refer to only one shell 10, i.e. in particular the beam of the side end 7, for the sake of brevity.

However, the teachings provided for the shell 10 described in detail are directly applicable to other shells of the chassis cell 2 or even to the entire chassis cell 2 considered as one single shell. In other words, each characteristic described for the shell 10 described in detail herein is applicable per se to all the other shells 10 of the chassis cell 2 or even to the entire chassis cell 2 considered as one single shell.

The shell 10 has at least two walls 11, 12 facing one another so as to define or delimit at least partly a cavity 13 between the walls 11, 12.

Specifically, the walls 11, 12 are transversal to an axis B transversal with respect to the axis A and passing through the sides of the passenger compartment. In other words, the axis B is transversal to the side door 4 in the closed position or passes through the opening of the side end 7.

The beam of the side end 7 or the shell 10 can also have other walls delimiting or defining at least partly the cavity 13, additionally or alternatively to the walls 11, 12.

For example, each one or also only one of the pillars 8 is delimited according to the axis A by two walls 15, 16 transversal to the axis A. More precisely, the walls 15, 16 extend between the walls 11, 12 transversally to the walls 11, 12.

In particular, the walls 15, 16 face one another.

Furthermore, each one or also only one of the pillars 8 is delimited by respective wall portions 17, 18 of the walls 11, 12.

Hence, the wall portions 17, 18 and the walls 15, 16 form one or each one of the pillars 8.

The wall portions 17, 18 or the walls 15, 16 face one another so as to define or delimit at least partly a cavity 14, that is part of the cavity 13. The cavity 14 is completely defined or delimited by the walls 15, 16 and by the wall portions 17, 18. Each one of the pillars 8 can define the corresponding cavity 14, for example by means of the walls 16 or the wall portions 17, 18.

Similar concepts apply, for example, also to the door sill 9, which is delimited by respective wall portions 19, 20 of the walls 11, 12.

Furthermore, the door sill 9 is delimited according to an axis C by two walls 21, 22 transversal to the axis C, where the axis C is transversal both to the axis A and to the axis B. More precisely, the walls 21, 22 extend between the walls 11, 12 transversally to the walls 11, 12.

Additionally, the wall 21 extends between the walls 15 of the two pillars 8 transversally to the walls 15, whereas the wall 22 extends between the walls 16 transversally to the walls 16.

In particular, the walls 21, 22 face one another.

The shell 10 further comprises a plurality of partitions 24 comprising carbon fibre.

Each one of the partitions 24 can comprise or be defined by a plate, in particular flat.

Each one of the partitions 24 extends transversally to the walls 11, 12 between ends respectively connected to the walls 11, 12 seamlessly, i.e. forming one single body with the walls 11, 12.

In particular, as it will be apparent in the following, the ends of the partitions 24 are fused to the walls 11, 12, i.e. connected by fusion or possibly welded, but not glued or fixed by means of fixing devices.

Alternatively or additionally, each one of a first group of the partitions 24 extends transversally to the walls 15, 16 of one or of the other one of the pillars 8 between ends respectively connected to the walls 15, 16 seamlessly, i.e. forming one single body with the walls 11, 12.

Alternatively or additionally, each one of a second group of the partitions 24 extends transversally to the walls 21, 22 of the side member 9 between ends respectively connected to the walls 21, 22 seamlessly, i.e. forming one single body with the walls 21, 22. Specifically, the second group of the partitions 24 is composed of one of the partitions 24.

Preferably, some between the partitions 24 are groupable between one another for forming geometrical shapes, possibly complex.

Figure 4:
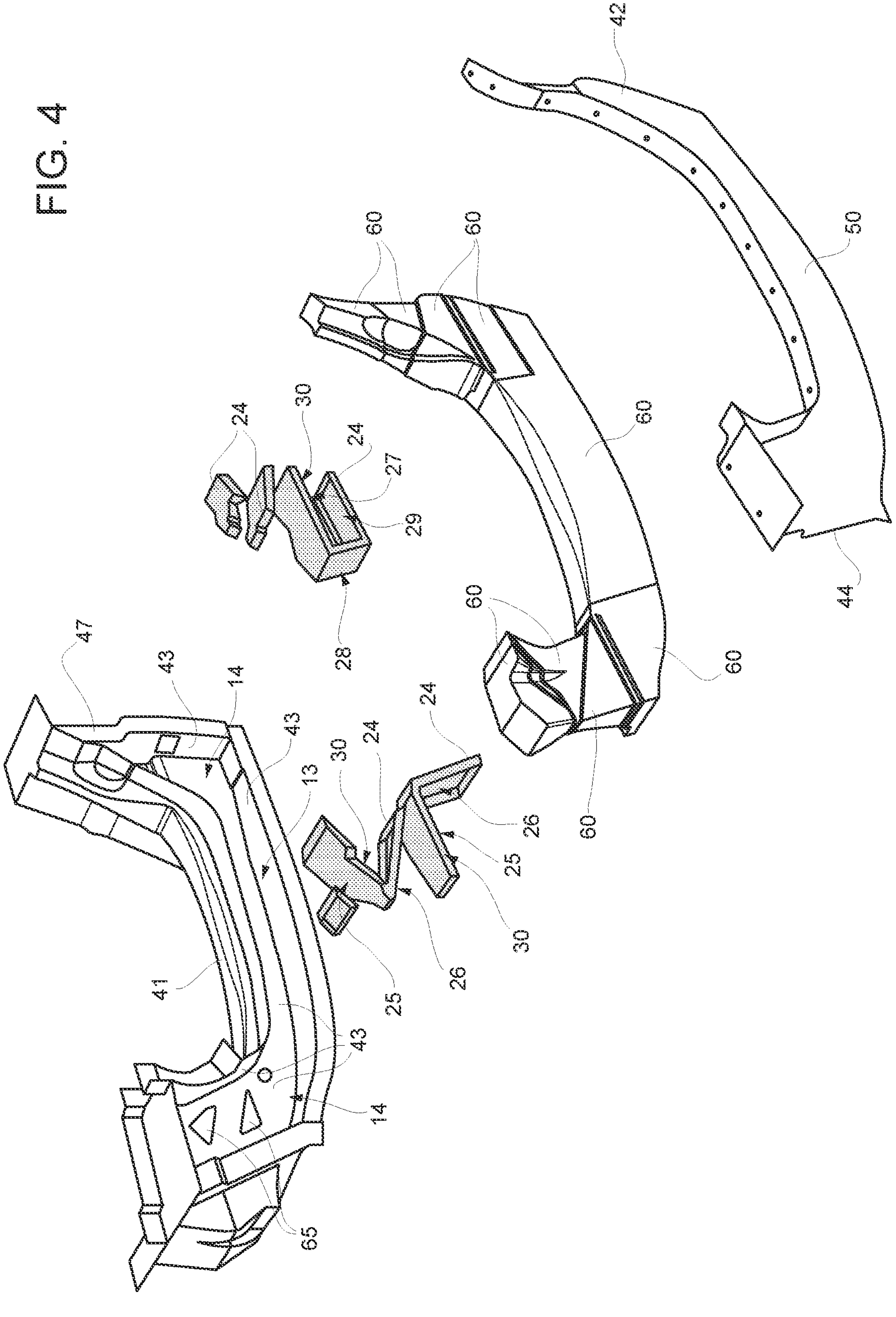
FIG. 4 is an exploded view of a mould closed during the manufacturing process.

For example, two of the partitions 24 have respective surfaces 25, 26, in particular transversal to the walls 11, 12, which extend on respective incident planes according to an acute angle, such that the same two of the partitions 24 form a V-shaped structure or a crocodile mouth structure, as is better visible in FIG. 4.

Furthermore, three of the partitions 24 have respective surfaces 27, 28, 29, in particular transversal to the walls 11, 12, and of which the surfaces 27, 29 face one another and are both transversal to the surface 28, hence the same three of the partitions 24 form a C-shaped structure or an omega-shaped structure or a U-shaped structure, as is visible in FIG. 4.

In FIG. 4, the surfaces 30 of the partitions 24 are visible, where the surfaces 30 are the connected ones, in particular in a direct manner, i.e. in contact with the wall 11.

In general, the shape and/or the arrangement of the partitions 24 is optimized, for example making use of computer programmes aiding the design, in particular based on the calculation at the finished elements, with the aim to maximize the sturdiness of the shell 10 to the crashes and/or optimize a ratio of sturdiness to overall weight of the shell 10.

Figure 2:
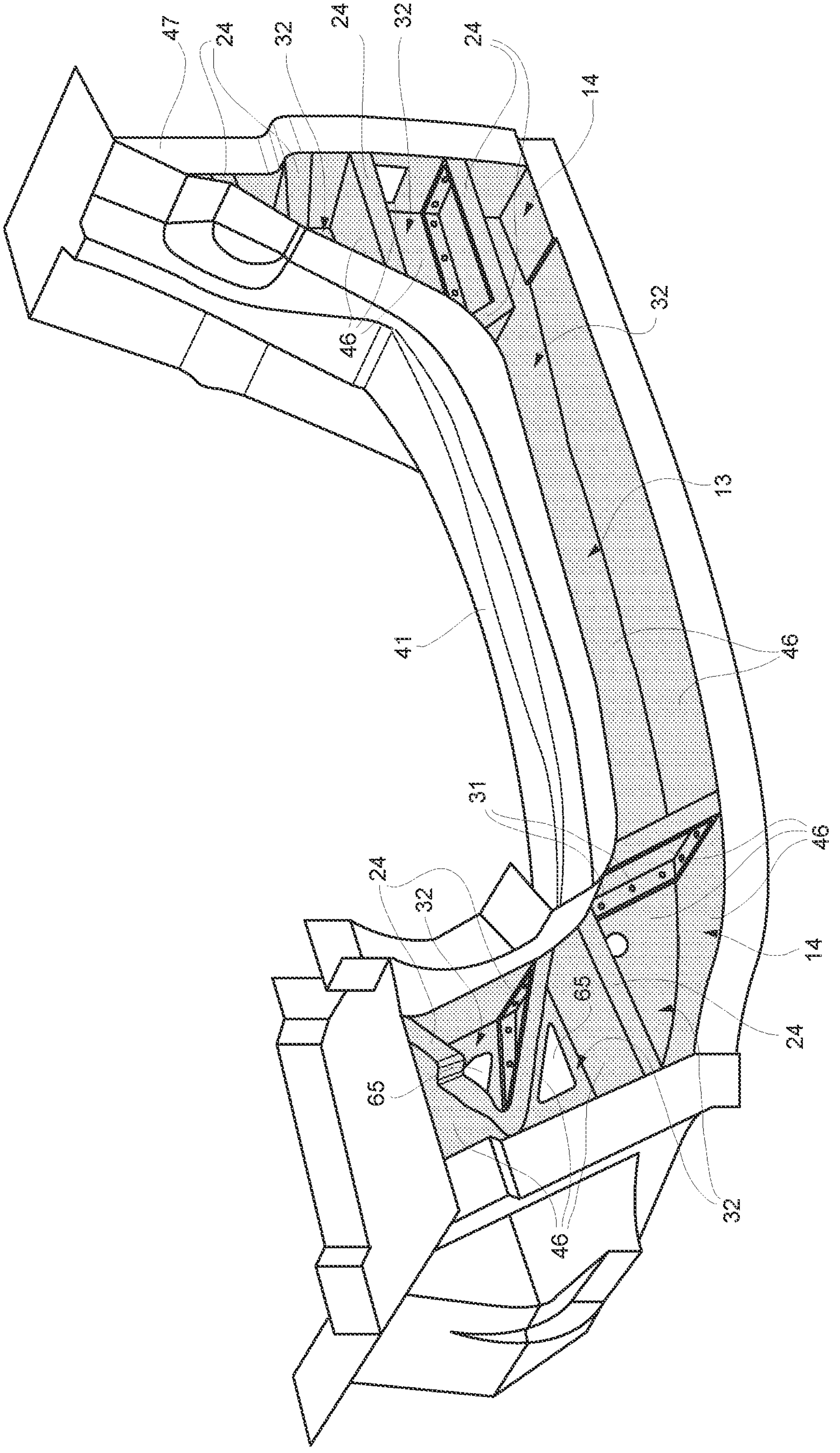
FIG. 2 is a perspective view illustrating a step of a process for manufacturing the chassis cell according to a further embodiment of the invention.

As is better visible in FIG. 2, the partitions 24 are arranged so as to divide the cavity 13 into a plurality of separate compartments 32.

Furthermore, at least the majority of the partitions 24 is positioned at the pillars 8, i.e. inside the cavities 14 of the pillars 8.

According to a particular embodiment, the chassis cell 2 further comprises a plurality of bags 60 respectively arranged inside the compartments 32.

Possibly, the number of bags 60 could be less with respect to the compartments 32. Therefore, the chassis cell 2 could also comprise only one bag 60 inside a corresponding compartment 32.

In the following, a process for manufacturing the chassis cell 2 will be described.

More precisely, the process for manufacturing the above-described shell 10 with the partitions 24 inside will be described in detail, whereas the processes for manufacturing the other shells 10 will not be described in detail since they are substantially similar to the one described.

In other words, each one of the characteristics of the described process is directly applicable in an independent manner to the processes for manufacturing each one of the shells 10 or also the entire chassis cell 2 considered as one single shell.

The process comprises providing a mould 40 having inner walls configured or adapted to define the cavity 13. In other words, the inner walls of the mould 40, clearly understood as a closed mould, enclose a cavity identical to the cavity 13. Still in other words, the inner walls of the mould 40 delimit a cavity including the cavity 13.

In view of this, the term cavity 13 will be used herein for identifying both the actual cavity 13 of the shell 10 at the end of the process and the cavity 13 inside the closed mould 40.

The mould 40 in particular comprises at least two portions 41, 42. More in particular, the mould 40 is closed when the two portions 41, 42 are coupled to one another so as to enclose the cavity 13.

Therefore, the inner walls of the mould 40 include first inner walls 43 of the portion 41 and second inner walls 44 of the portion 42.

As is visible in FIG. 2, showing the portion 41 of the mould 40, the process comprises fixing the partitions 24, previously cured and thus in their state of finished product, to the mould 40. The partitions are fixed according to their actual arrangement inside the cavity 13 and at the inner walls 43.

Hence, the partitions 24 are arranged inside the mould dividing the cavity 13 into the compartments 32.

Therefore, more precisely, the partitions 24 are fixed to the portion 41 of the mould 40.

For example, the partitions 24 are fixed, i.e. held in their arrangement, by means of threaded members 31 such as bolts. Alternatively, the partitions 24 could be fixed by means of other fixing means, such as for example structural foams or gluing materials.

Therefore, the process can further comprise placing a plurality of raw carbon fibre foils or sheets 46 on the inner walls 43 in positions adapted to form at least the wall 12.

Therefore, the inner walls 43 are configured to form at least the wall 12.

Actually, specifically, as is shown in FIG. 2, the raw carbon fibre sheets 46 are arranged on the inner walls 43 for also forming the walls 15, 16 of each one of the pillars 8, as well as for forming the walls 21, 22 of the door sill 9.

Therefore, the inner walls 43 are further configured to also form the walls 15, 16 and the walls 21, 22.

Further carbon fibre sheets 46 can be also placed on the partitions 24, in particular independently on each one of their surfaces.

Furthermore, preferably, the partitions 24 are connected to the raw carbon fibre sheets 46 by means of adhesive films configured to dissolve or at least soften during the baking in an autoclave so as to facilitate the junction between the carbon fibre sheets 46 being baked and the partitions 24.

The carbon fibre sheets 46 in particular comprise a carbon fibre fabric impregnated in a resin, more in particular of thermosetting type.

Figure 3:
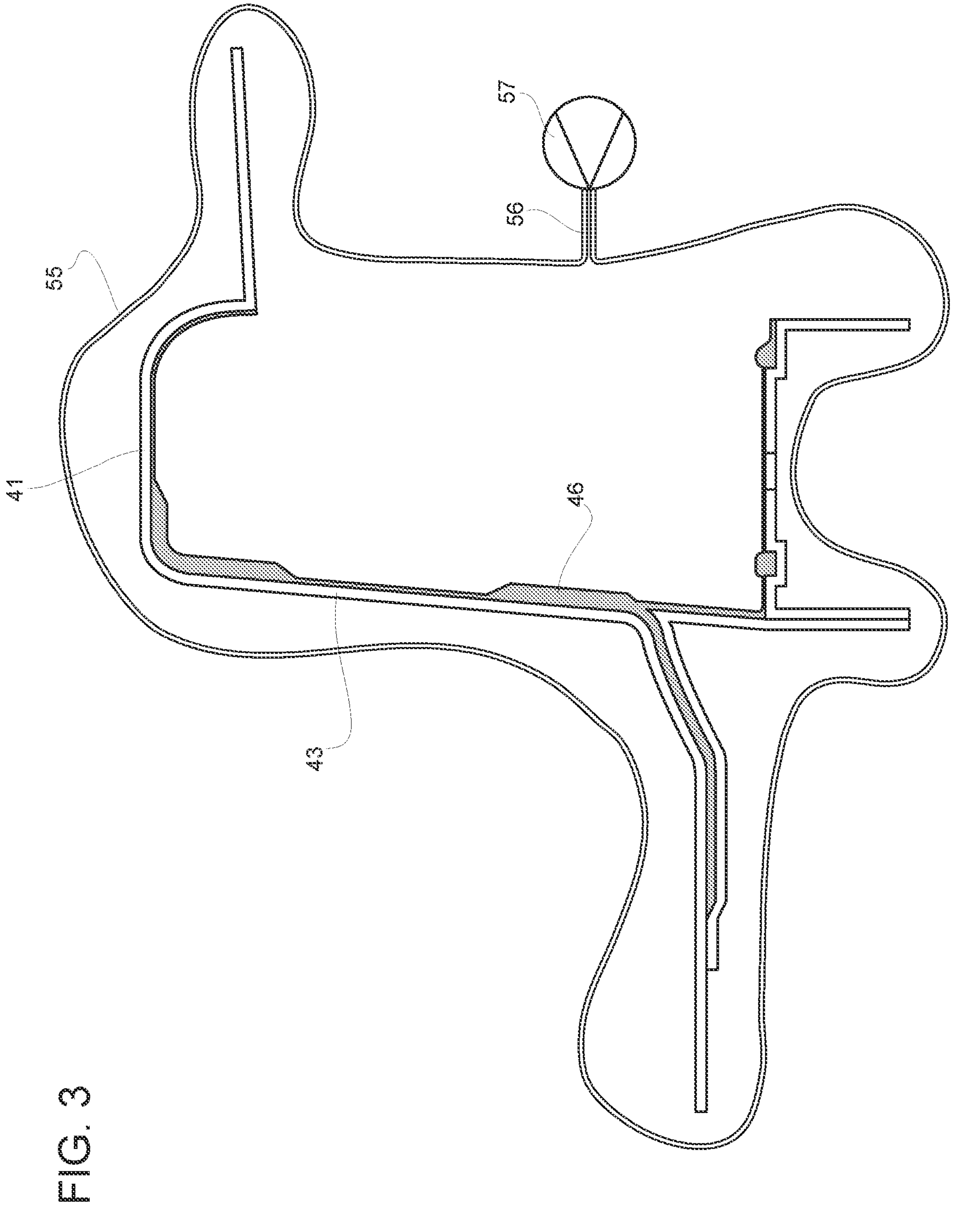
FIG. 3 is a section view illustrating a further step of the manufacturing process.

As is visible in FIGS. 2 and 3, the portion 41 defines an inner cavity thereof which substantially includes the cavity 13.

The portion 41 comprises an outer contour 47 configured to face the portion 42 during the closing of the mould 40 according to a mould closing direction H.

Furthermore, also the portion 42 has a contour configured to coincide with the outer contour 47 when the mould 40 is closed.

Figure 5:
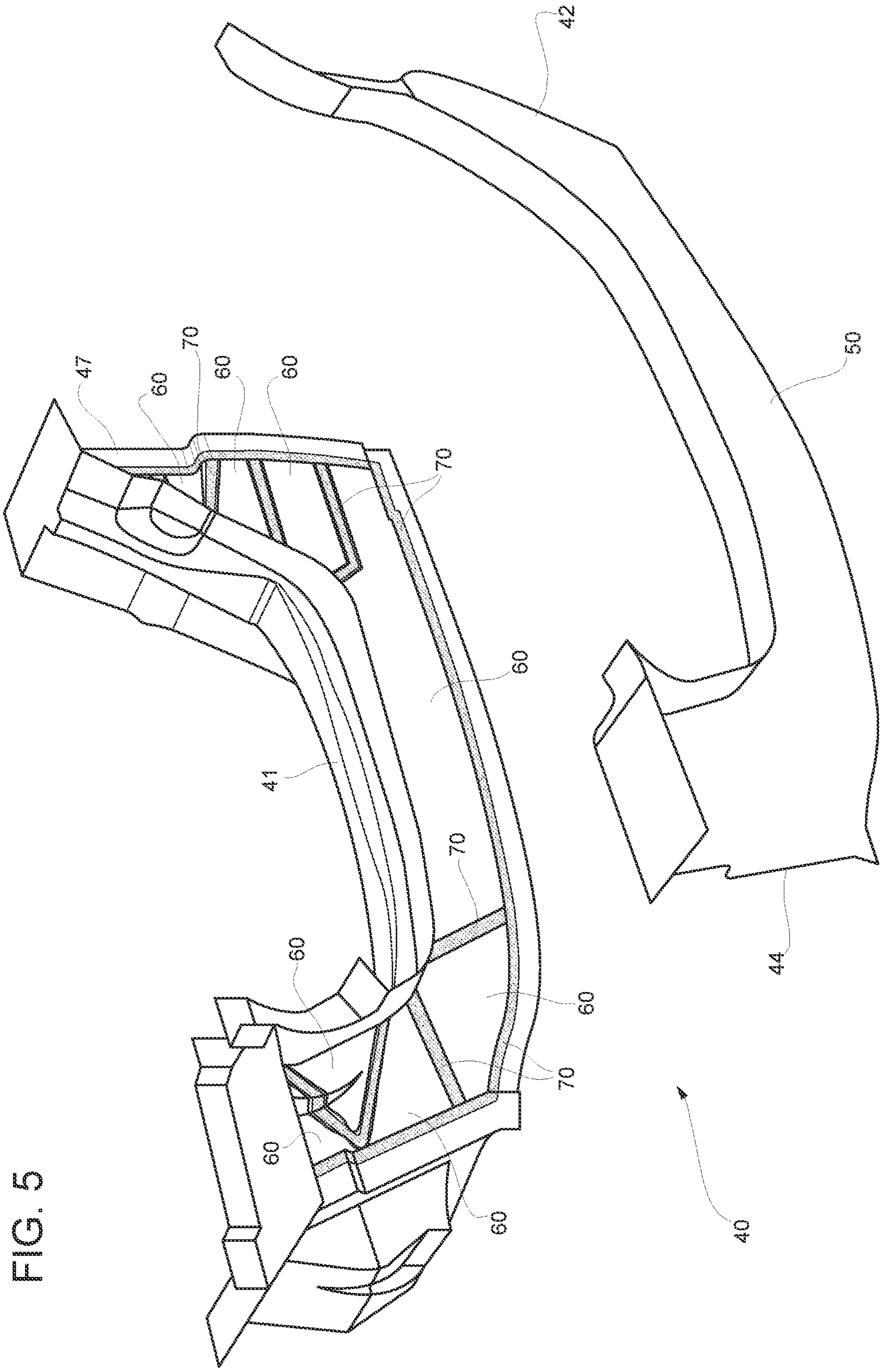
FIG. 5 is a perspective view illustrating the mould of FIG. 4 in an open configuration.

As is visible in FIGS. 4 and 5, the portion 42 comprises a plate 50 comprising the inner walls 44 and configured to close the cavity 13 when the contour of the portion 42 coincides with the contour 47, i.e. as soon as the mould 40 is closed.

Optionally, the process comprises a first baking in the autoclave of the raw carbon fibre sheets 46 placed on the inner walls 43. In the first baking, the raw carbon fibre sheets 46 are baked together with the partitions 24 fixed to the portion 41 at the inner walls 43.

Therefore, the first baking is carried out arranging the portion 41 with the raw carbon fibre sheets 46 and the partitions 24 in the autoclave, without the portion 42.

More specifically, before arranging the portion 41 with the raw carbon fibre sheets 46 and the partitions 24 in the autoclave, the portion 41 with the raw carbon fibre sheets 46 and the partitions 24 is enclosed, under vacuum, inside a vacuum bag 55 (FIG. 3).

For example, the vacuum bag 55 can comprise a polyamide fibre, in particular aliphatic, or silicone.

The vacuum bag 55 comprises at least one valve device 56 configured to connect the vacuum bag 55 to a vacuum pump 57.

The vacuum pump 57 is connected to the vacuum bag 55 by means of the valve device 56. Therefore, the vacuum pump 57 is used so as to suck the air inside the vacuum bag 55 containing the portion 41 with the raw carbon fibre sheets 46 and the partitions 24. In this manner, the portion 41 with the raw carbon fibre sheets 46 and the partitions 24 is vacuum-sealed.

At this point, the first baking is made arranging the vacuum bag 55 containing the portion 41 with the raw carbon fibre sheets 46 and the partitions 24 in the autoclave.

Clearly, the first baking is made by operating the autoclave.

After the first baking, the vacuum bag 55 is removed, for example by means of breakage or simply extracting it after reintroducing air in the vacuum bag 55 by means of the valve device 56.

At this point, the process comprises placing a plurality of raw carbon fibre sheets 58 on the inner walls 44 in positions adapted to form at least the wall 11.

The raw carbon fibre sheets 58 are preferably of the same type of the raw carbon fibre sheets 46.

The raw carbon fibre sheets 58 and/or the raw carbon fibre sheets 46 can be held in their position for example by means of adhesive films configured to dissolve or at least soften during the baking in the autoclave.

Therefore, the mould 40 can be closed with inside the raw carbon fibre sheets 58, the partitions 24, and possibly also the carbon sheets baked due to the first baking.

The process further comprises a second baking in the autoclave of the raw carbon sheets 58 placed inside the mould 40 and more precisely on the inner walls 34, together with the partitions 24 and in particular also with the carbon fibre sheets baked with the first baking.

More specifically, before the second baking, the process comprises placing the bags 60 respectively inside the compartments 32 in the mould 40.

The mould 40, in particular when it is closed, has at least one corresponding opening 61 for each one of the compartments 32, such that the openings 61 respectively establish a connection between the compartments 32 and the outside of the mould 40.

In other words, the mould 40 is configured to define or defines the openings 61 for respectively establishing a connection between the compartments 32 and the outside of the mould 40.

Clearly, the openings 61 are through openings, in particular through the inner walls 43 or the inner walls 44.

The bags 60 have respective air inlets 63, by means of which the bags 60 can be inflated with pressurized air. The air inlets 63 are suitable for allowing the inlet of pressurized air inside the bags 60.

Figure 6:
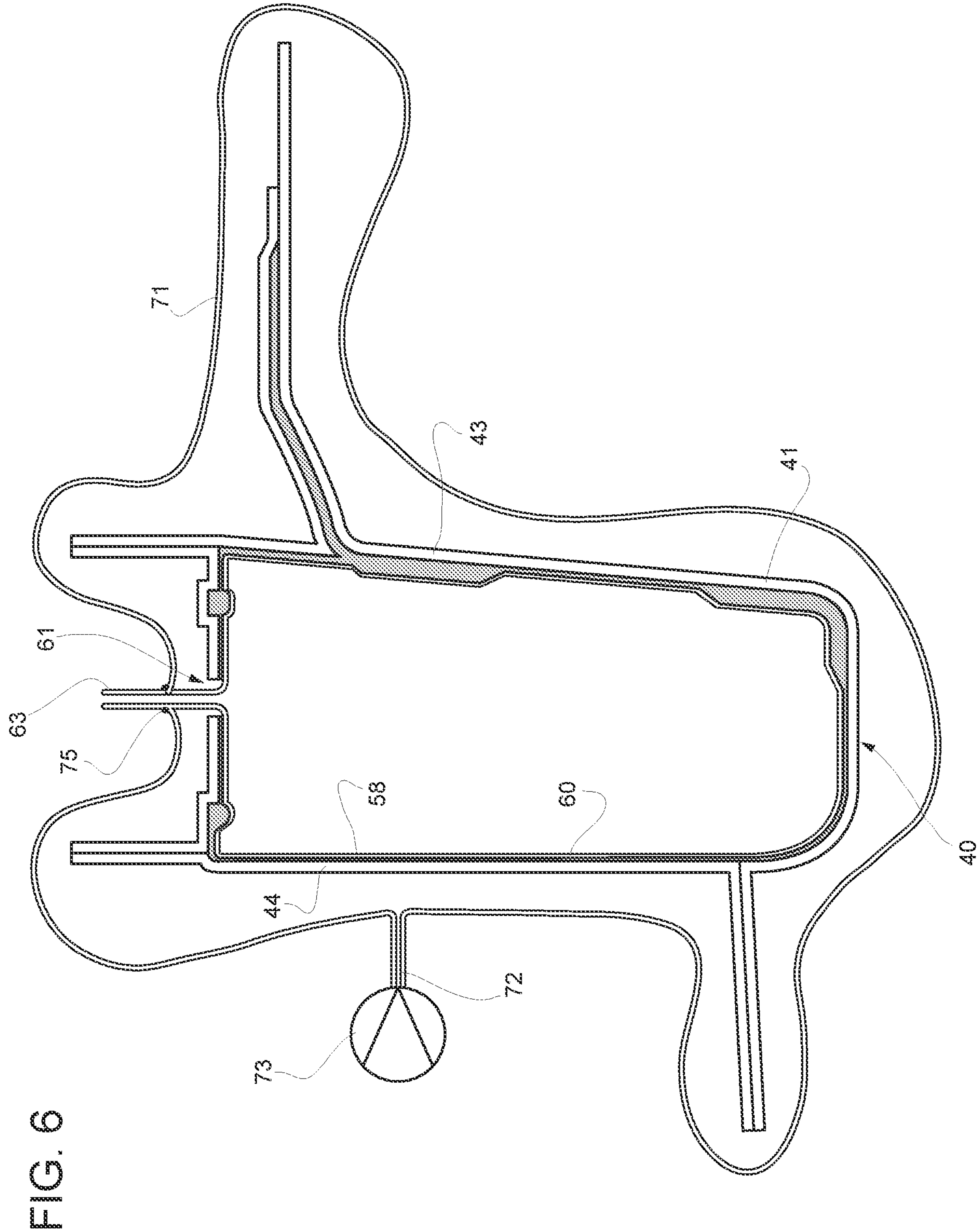
FIG. 6 is a section view illustrating a following step of the manufacturing process with respect to the step of FIG. 3.

The bags 60 are placed inside the compartments 32 with the air inlets 63 on the outside of the mould 40, also when it is closed as in FIG. 6, through the openings 61.

Therefore, the air inlets 63 come out of the mould 40, also when it is closed, by means of the openings 61.

In this manner, during the second baking, the mould 40 contains the bags 60, which are inflated by the pressurized air of the autoclave. In fact, the pressurized air flows into the bags 60 by means of the air inlets 63 coming out of the mould 40 through the openings 61.

By inflating, the bags 60 press the raw carbon fibre sheets 58 against the inner walls 44 during the second baking.

Therefore, the dimensions of the bags 60 enable the bags to expand under the pressure of the pressurized air inside the compartments 32 occupying a volume equal to that of the compartments 32.

For example, the bags 60 can comprise polyamide fibres, in particular aliphatic, or silicone, i.e. plastic resins, in particular of thermoplastic type, so as to be heat-sealable.

The mould 40 and more in particular the portion 41 can have openings 65 for allowing an extraction of the bags 60 from the mould 40 after the second baking.

The openings 65 are through openings through the inner walls 43.

The bags 60 can be approved for being reusable, in particular for further bakings.

Alternatively, the bags 60 can be left inside the compartments 32, which will remain the compartments 32 of the shell 10 or of the chassis cell 2. In this case, the openings 65 can be particularly reduced in size or even absent.

The outcome of the second baking is specifically the shell 10.

Preferably, as is visible in FIG. 5, the surfaces 30 and possibly the outer contour 47 are covered with adhesive films 70 for allowing an adhesion of the raw carbon fibre sheets 58 on the inner walls 44 to the partitions 24 in the closing of the mould 40, in this case before the second baking.

In particular, FIG. 5 illustrates the bags 60 introduced in the compartments 32, more in particular inside the portion 41.

Conveniently, as is visible in FIG. 6, the mould 40 is enclosed, under vacuum, during the second baking inside a vacuum bag 71.

Therefore, before arranging the mould 40 with the raw carbon fibre sheets 56 and the partitions 24 in the autoclave, the mould 40 is enclosed, under vacuum, inside the vacuum bag 71.

For example, the vacuum bag 71 can comprise a polyamide fibre, in particular aliphatic, or silicone.

The vacuum bag 71 comprises at least one valve device 72 configured to connect the vacuum bag 71 to a vacuum pump 73.

The use of the vacuum bag 71, of the valve device 72, as well as the vacuum pump 73 is respectively similar to that of the vacuum bag 55, of the valve device 56, as well as the vacuum pump 57, hence it will not be described in further detail.

The vacuum bag 71 is connected, in a fluid-tight manner, to each one of the bags 60 on the outside of the mould 40.

The air inlets 63 of the bags 60 come out of the vacuum bag 71, so as to be able to carry out their function.

Therefore, the air inlets 63 continue to enable the inlet of pressurized air in the autoclave inside the bags 60, so that the bags 60 are inflated.

Simultaneously, since the vacuum bag 71 is connected, in a fluid-tight manner, to the bags 60, the pressurized air does not flow into the vacuum bag 71, so that the vacuum can be maintained inside the vacuum bag 71.

The vacuum bag 71 compresses, in particular due to the vacuum generated therein, the mould 40 from the outside, though allowing pressurized air of the autoclave to inflate the bags 60 from the inside of the mould 40.

Preferably, the fluid-tight connection between the bags and the vacuum bag 71 is carried out by means of a sealing glue 75, more in particular a rubber cement.

At the end of the second baking, the vacuum bag 71 can be removed, for example by means of breakage or anyway in a manner similar to how the vacuum bag 55 is removed.

Once the vacuum bag 71 is removed, the shell 10 or possibly the chassis cell 2 is manufactured.

The first baking is optional and therefore it could be omitted. In this case, the second baking becomes one single baking of all the carbon fibre sheets 46, 58, together with the partitions 24 in the closed mould 40.

Also for the one single baking, all the characteristics described for the second baking are applicable. Therefore, the bags 60 and the vacuum bag 71 are utilizable according to what described in the foregoing.

In the case with single baking, the raw carbon fibre sheets 46 and the raw carbon fibre sheets 58 are respectively placed on the inner walls 43, 44 for forming at least the walls 11, 12.

The mould 40 is closed with the raw carbon fibre sheets 46 and the raw carbon fibre sheets 58 inside the cavity 13, together with the partitions 24.

Based on the foregoing, the advantages of the chassis cell 2 and of the process according to the invention are evident.

The partitions 24 comprise carbon fibre, hence they are light and simultaneously resistant. In this manner, the chassis cell 2 can be lightened without losing sturdiness.

Furthermore, the fact that the partitions 24 are joined to the shell 10 seamlessly even more increases the sturdiness of the chassis cell 2, with respect to possible cases in which the partitions 24 are simply glued or held in position by means of structural foams.

The manufacturing process is very effective and versatile. In fact, the carrying out of one single baking results to be simplified; on the other hand, performing the process by means of two bakings allows a better control of the pressure inside the mould 40.

Furthermore, after the first baking, the portion 41 is completely viewable, hence it is possible to check manufacturing defects. In this manner, the second baking can be performed keeping into account the outcome of the first baking, or it can be not carried out should the intermediate product of the first baking be a waste, i.e. has an unacceptable quality.

The use of the bags 60 definitely improves the control of the pressure inside each one of the compartments 32 during the second baking.

The use of the bags 60 becomes even more advantageous should they be reusable.

Finally, it is evident that modifications and variations can be made to the chassis cell 2 and to the process according to the invention, which do not anyway depart from the scope of protection defined by the claims.

In particular, the number and the shape of the described and illustrated components could be different and in particular varied with great freedom.

Furthermore, numeral adjectives such as first and second are utilized for increasing the clarity of the description, but must not be understood as strictly limiting. In fact, the first and the second bakings could coincide with one single baking.

The invention claimed is:

1. A chassis cell for a motor vehicle, wherein the chassis cell defines a passenger compartment for the motor vehicle and comprises:

at least one shell comprising carbon fibre and two first walls facing one another so as to define a cavity between the two first walls, one or more partitions comprising carbon fibre arranged inside the cavity according to an arrangement, each of the one or more partitions having two first ends extending transversally between the two first walls, the two first ends being respectively connected to the two first walls;

wherein a seamless interface existing between the one or more partitions and the two first walls is characterized in that the one or more partitions, the at least one shell, and the two first walls are a single, monolithic piece.

2. The chassis cell according to claim 1, wherein the partitions are arranged so as to divide the cavity into a plurality of separate compartments.

3. The chassis cell according to claim 2, further comprising a plurality of bags respectively arranged inside the compartments.

4. The chassis cell according to claim 1, comprising a beam that is part of a side end of the chassis cell, wherein the side end has an opening to allow a person to get into the passenger compartment and to be occupied by a side door of the motor vehicle in a closing position, in which the side door prevents said person from getting into the passenger compartment through the opening, the beam comprising the first walls and the partitions and extending along a straight direction between two beam ends defined by respective pillars transversal to the straight direction, the beam further comprising a door sill along the straight direction between the pillars, the door sill forming one single piece with the pillars.

5. The chassis cell according to claim 4, wherein the beam comprises two second walls delimiting one of the pillars according to the straight direction and extending between the first walls transversally to the first walls, wherein the partitions further extend inside the pillars between second ends respectively connected to the second walls seamlessly.

6. A process for manufacturing a chassis cell according to claim 1, the process comprising the steps of a. providing a mould having inner mould walls configured to define said cavity, b. fixing the previously cured partitions to the mould according to said arrangement inside said cavity and at first inner mould walls of said inner mould walls, c. placing a plurality of raw carbon fibre sheets on second inner mould walls of said inner mould walls in positions adapted to form at least one of said first walls, and d. baking the raw carbon fibre sheets arranged inside the mould together with the partitions in an autoclave.

7. The process according to claim 6, wherein the partitions are arranged inside the mould dividing the cavity into a plurality of separate compartments.

8. The process according to claim 7, wherein the mould has a plurality of through openings, which respectively establish a connection between the compartments and the outside of the mould, the process further comprising the step of placing respective bags inside the compartments in the mould so that the bags have respective air inlets on the outside of the mould through the through openings, the air inlets being adapted to allow pressurized air to flow into the bags, wherein the mould (contains bags inside the compartments during step d., so that pressurized air of the autoclave inflates the bags during the baking, thereby pressing the raw carbon fibre sheets against the second inner mould walls during the baking.

9. The process according to claim 8, wherein the mould, during step d., is enclosed, under vacuum, inside a first vacuum bag connected, in a fluid-tight manner, to each one of the bags on the outside of the mould and with the air inlets coming out of the first vacuum bag, so that the first vacuum bag compresses the mould from the outside, though allowing pressurized air of the autoclave to inflate the bags from the inside of the mould.

10. The process according to claim 6, wherein the mould comprises a first and a second portion respectively comprising the first and the second inner mould walls, the process further comprising the steps of e. placing further raw carbon fibre sheets on the first inner mould walls in positions adapted to form the other one of said first walls, and f. baking the further raw carbon fibre sheets arranged on the first inner mould walls together with the partitions in a further autoclave or in said autoclave, wherein steps c. and d. are carried out after step f.

11. The process according to claim 6, wherein the mould comprises a first and a second portion respectively comprising the first and the second inner mould walls, the process further comprising the steps of e. placing further raw carbon fibre sheets on the first inner mould walls in positions adapted to form the other one of said first walls, f. enclosing, under vacuum, the first portion with the partitions and the further raw carbon fibre sheets on the first inner mould walls inside a second vacuum bag, g. baking the further raw carbon fibre sheets enclosed, under vacuum, in the second vacuum bag together with the partitions in a further autoclave or in said autoclave, and h. removing the second vacuum bag after step g., wherein steps c. and d. are carried out after step h.

* * * * *